United States Patent
Godfrey et al.

(10) Patent No.: US 9,452,854 B1
(45) Date of Patent: Sep. 27, 2016

(54) SYSTEM AND METHODS FOR MANAGING AND TRACKING CONTROLLED MATERIAL MOVEMENT

(71) Applicants: Steven C. Godfrey, Mims, FL (US); Richard B. Evans, Sparr, FL (US)

(72) Inventors: Steven C. Godfrey, Mims, FL (US); Richard B. Evans, Sparr, FL (US)

(73) Assignee: Intellifuel Systems, Inc., Titusville, FL (US)

( * ) Notice: Subject to any disclaimer, the term of this patent is extended or adjusted under 35 U.S.C. 154(b) by 832 days.

(21) Appl. No.: 13/736,308

(22) Filed: Jan. 8, 2013

Related U.S. Application Data (63) Continuation-in-part of application No. 13/598,118, filed on Aug. 29, 2012, now abandoned.

(60) Provisional application No. 61/528,489, filed on Aug. 29, 2011.

(51) Int. Cl.
| | |
|---|---|
| *G06F 7/00* | (2006.01) |
| *B65B 57/00* | (2006.01) |
| *G05B 15/02* | (2006.01) |
| *G06Q 10/08* | (2012.01) |

(52) U.S. Cl.
CPC ............... *B65B 57/00* (2013.01); *G05B 15/02* (2013.01); *G06Q 10/0875* (2013.01)

(58) Field of Classification Search
USPC ......................................................... 700/228
See application file for complete search history.

(56) References Cited

U.S. PATENT DOCUMENTS

| | | | |
|---|---|---|---|
| 2004/0148052 A1* | 7/2004 | Ferguson ............... | G06Q 10/08 700/213 |
| 2005/0234641 A1* | 10/2005 | Marks .................... | G06Q 10/08 701/484 |
| 2008/0120203 A1* | 5/2008 | Humprecht ............ | G06Q 10/08 705/28 |

\* cited by examiner

*Primary Examiner* — Kyle Logan
(74) *Attorney, Agent, or Firm* — Allen Dyer Doppelt Milbrath & Gilchrist (57) ABSTRACT

Computer-based systems and method for managing and tracking controlled material movements receive significant movement information items at a controlled material movement control server and allow a plurality of users to readily access all or portions of the information items. The systems and methods apply predetermined rules to the movement information items to flag features of interest and facilitate the employment of limited real-world time and resources.

20 Claims, 4 Drawing Sheets

SYSTEM AND METHODS FOR MANAGING AND TRACKING CONTROLLED MATERIAL MOVEMENT

CROSS-REFERENCE TO RELATED APPLICATIONS

This application is a continuation-in-part of U.S. Non-provisional patent application Ser. No. 13/598,118, filed on Aug. 29, 2012, which claims the benefit of U.S. Provisional Patent Application Ser. No. 61/528,489, filed on Aug. 29, 2011, the contents of which applications are herein incorporated by reference in their entireties.

FIELD OF THE INVENTION

The present invention relates to the control and tracking of controlled materials, and more particularly, to computer-based systems and methods for facilitating such control and tracking.

BACKGROUND OF THE INVENTION

There are many motives for controlling the movement of certain materials. Perhaps most prominently, where characteristics of the material inherently (either of themselves, or when combined with other readily available materials) present serious hazards to health, property or the environment, government agencies will ordinarily takes steps to regulate and monitor its transportation. Common examples of such "hazardous materials" include toxins, incendiaries and explosives. The term "controlled material" is used generically herein to refer to hazardous materials, as well as other materials subject to restrictions on their movement.

A simplified movement of gasoline would be illustrative of the procedures currently in place to control and track hazardous material movements. A gas station (the "destination") orders a certain volume of gasoline be delivered from a distributor (the "marketer"). Having agreed to fill the order, the marketer contacts the appropriate government regulator to obtain approval for the desired movement of gasoline. Provided the regulator approves the movement, authorization is granted.

The marketer contracts with a truck operator (the "carrier") to pick up the gasoline from a fuel depot (the "origin"). A bill of lading ("BOL") is generated when the carrier picks up the gasoline. The BOL lists factual information about the shipment, such as the type and amount of product loaded, the date and time of the loading, origin and carrier information, and may indicate other information, such as the intended destination (at least in general terms).

The carrier transports the gasoline to the destination. The gasoline is unloaded at the destination, and delivery ticket is generated confirming the delivery. Reconciliation between the BOL and the delivery ticket is generally a precursor to completing the various payments between parties for the movement. For example, the marketer ordinarily paid the origin in order to get the gasoline released. The BOL allows verification that the amount of fuel paid for was actually received by the carrier. The delivery ticket allows verification that the purchased and loaded fuel was delivered to the destination. With such verification, the marketer bills the destination and pays the carrier.

While the foregoing example shows the parties usually involved in a controlled material movement (although in some movements, the parties are not necessarily distinct business entities—e.g., the marketer, carrier and destination could all be commonly owned) and illustrates the general thrust of the movement (i.e., getting permission, actually moving the material from point A to point B and verifying its delivery), actual controlled material movements can be significantly more complex. For example, it is common for a carrier to deliver to multiple destinations, meaning that multiple delivery tickets would need to be reconciled to account for the entirety of a given load. Additionally, due to changing real world circumstances, errors, etc., the intended destination(s) will often change after the carrier leaves the origin with the controlled material.

These added complexities will make the logistics of the movement more complicated for the parties involved, especially the marketer. However, even with relatively simply movements, the sheer number of controlled materials movements undertaken on a daily basis can quickly overwhelm the government agency(ies) tasked with overseeing the movement for safety and/or revenue purposes. In the case of the U.S., and many other jurisdictions, there are simply not enough personnel and resources to check on even a tenth of the movements of controlled materials occurring at a given moment. Thus, potential irregularities in a movement will often not come to the attention of the government authorities until well after the time for effective intervention. Even with the more widespread use of tracking technologies that potentially allow the real-time monitoring of all vehicles engaged in controlled material movements, the mere availability of such data, of itself, complicates rather than simplifies the regulatory and enforcement challenges faced by government authorities.

SUMMARY OF THE INVENTION

In view of the foregoing, it is an object of the present invention to provide improved systems and methods for managing and tracking controlled materials movements. According to an embodiment of the present invention, a computer-based system for managing and tracking controlled material movements includes at least one controlled material movement control server having at least one processor and machine-readable memory. The at least one processor and machine-readable memory are configured with program instructions to execute a user interface module for receiving and displaying controlled material movement information items, a movement information database for storing the movement information items, a rules database for storing movement flag generation rules and a comparison engine for generating movement flags based on application of the flag generation rules to the movement information items According to an aspect of the present invention, the movement information items include controlled material movement requests, movement authorizations and holds, bills of lading, movement location reports, movement delivery tickets, and the movement flags.

According to a method aspect, a computer-based method for managing and tracking controlled material movements includes receiving, in at least one controlled material movement server, a request for a movement of controlled material. The movement is assigned a unique identifier to the movement and, once approved, the server communicates notification that the movement has been authorized. A bill of lading for the movement is received in the controlled material movement server. Subsequently, a delivery ticket is received in the server and notification of its receipt is communicated thereby.

These and other objects, aspects and advantages of the present invention will be better appreciated in view of the drawings and following detailed description of preferred embodiments.

DETAILED DESCRIPTION OF PREFERRED EMBODIMENTS

Figure 1:
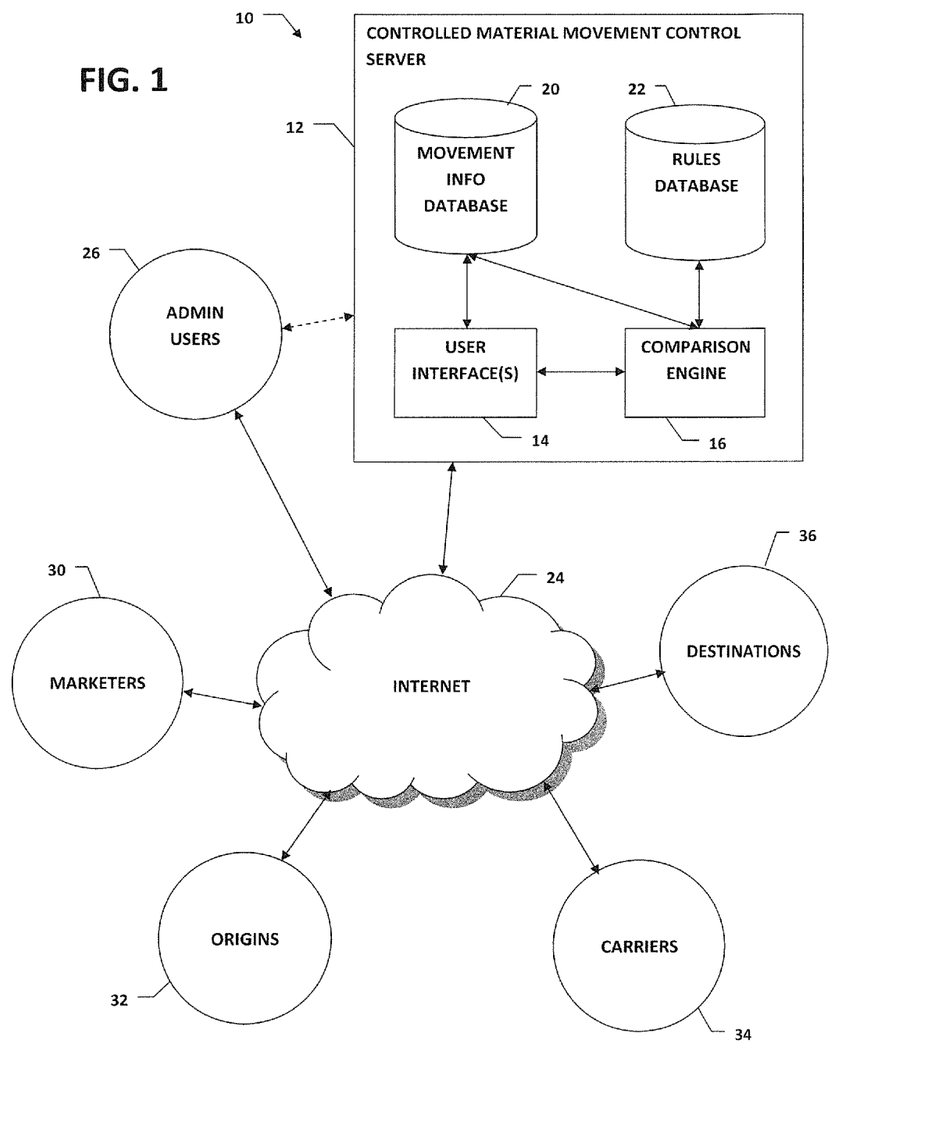
FIG. 1 is a schematic overview of a computer-based system for managing and tracking controlled material movements, including a controlled material movement control server, according to an embodiment of the present invention.
Figure 2:
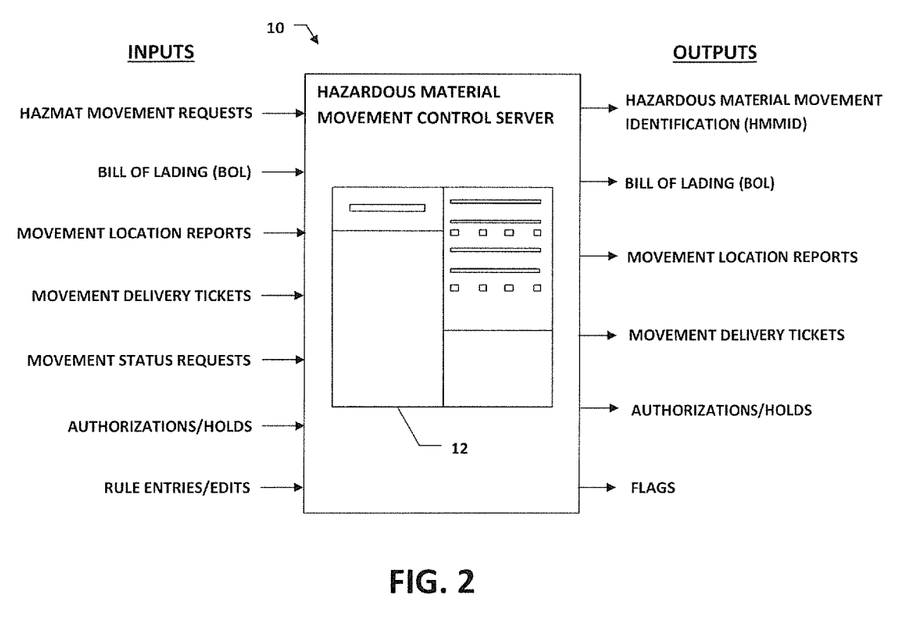
FIG. 2 is schematic diagram of the controlled material movement control server of FIG. 1, including inputs thereto and outputs thereof.

Referring to FIGS. 1 and 2, according to an embodiment of the present invention, a computer-based system 10 for managing and tracking controlled material movements includes a controlled material movement control server 12. The server 12 includes at least one processor and machine-readable memory. Using program instructions stored in the machine-readable memory, the processor executes one or more user interfaces 14, a comparison engine 16, a movement information database 20 and a rules database 22.

As used herein, the term "server" generically refers to a network-connected computer device that can perform functions based on inputs received over the network and return outputs over the network. The present invention is not necessarily limited to a particular type, number or configuration of servers or processors, and can encompass arrangements in which functions are distributed across a range of geographically disparate computing devices and/or in which the same function can be redundantly performed by multiple pieces of computer hardware. Likewise, while the term "machine-readable memory" should be understood to entail some tangible medium on which data and software instructions are stored, the present invention is not necessarily limited to a particular type of memory storage device or memory format, nor to a particular programming language or data storage format.

Using a network 24, such as the Internet, a plurality of users 26-36 supply movement information item inputs 40 to and receive outputs 42 from the server 12 via the one or more user interfaces 14. The users 26-36 include administrative users 26, such as government agencies (including government enforcement assets), marketers 30, origins 32, carriers 34 and destinations 36. The users 26-36 preferably interact with the server 12 with one or more computer devices, such as tablet computers, laptop computers, "smart" phones, desktop computers and the like.

In each implementation of the invention, all of the users 26-36 need not necessarily be involved and, as discussed above, the users 26-36 may not necessarily be associated with independent business entities. The system 10 could also accommodate interactions with other users beyond those listed. Moreover, the present invention does not necessarily require that all individual users 26-36 have access to computers or the Internet. For example, data relating to a carrier 34 without a computer device might be entered by an origin 32, a destination 36 and/or an administrative user 26. Similarly, each implementation of the invention may not necessarily include every listed movement information item input 40 and output 42, and could accommodate the input and output of additional movement information items.

Advantageously, the server 12 executes a plurality of user interfaces 14, such that the movement information items 40, 42 input by and output to various users 26-36 can be customized. For example, an interface for marketers 30 would allow them to input requests for controlled material movements and request movement status requests, while also being able to view authorizations/holds, BOLs, movement location reports, and delivery tickets related to their movements. Origins 32 could be provided with an interface allowing them to see movements relating to them that have been authorized, and to input and view BOL information for such movements. An interface for carriers 34 could also allow viewing of authorized movements relating to them, with the ability to input and view BOL information, movement location reports and movement delivery tickets. Destinations 36 could be provided with an interface allowing inputting and viewing of delivery tickets relating to them.

An interface for administrative users 26 preferably allows input and output of all movement information items 40, 42 relating to all movements tracked and controlled by the system 10. Additionally, the administrative users 26 will be able to enter and edit rules for the database 22, to view flags generated by the comparison engine 16 and to input holds and authorizations for requested movements. Preferably, within an administrative user 26 interface (and possibly within other interfaces), there can be levels of access and authority. For example, only specially designated administrative users could be allowed to enter or edit rules or authorize requested movements. Enforcement assets in the field could be allowed to view movement information and associated flags, but be more limited in their ability to input information; for example, an enforcement official could input location reports, but not BOLs or delivery tickets. Also, though many regulatory regimes will require an actual user to authorize movements, the present invention could also encompass systems 10 in which authorization for at least some movements was generated automatically based on determining that a request conforms to predetermined requirements.

It will be appreciated that the system 10 effectively centralizes communications relating to controlled material movements, making accurate and uniform information available to interested parties in a much timelier manner. This offers advantages from both business and regulatory standpoints, making wide acceptance of the system 10 much more likely.

The comparison engine 16 generates the flags based on rules stored in the rules database 22. In general, the flags assist administrative users 26 to make the best use of limited time and resources by automatically calling attention to controlled materials movements, and aspects thereof, which merit closer attention. The term "flag" is used generically, and does not necessarily imply a specific visual indicator associated therewith. The server 12 can draw user attention to a flag in various ways, one of which can include visual indicia provided when a user is viewing material information items associated with a given movement or movements. The server 12 could also automatically notify one or more users that is not actively using the system, for example via email or text, that a flag has been generated. Preferably, administrative users 26 can separately configure options for flag notification, including options about the timing and form of notification, as well as individual users to be notified.

Advantageously, a flag output will also include identification of the material movement information items giving rise to the flag, and an explanation of its applicability. Examples of flags and categories thereof are included in Tables 1-4 below. The flags are explained by further examples, although it will be appreciated that the present invention is not limited to such scenarios.

TABLE 1

Materal Identity Flags

| | |
|---|---|
| A. Material/Class Overlap(s) | Other class(es) of hazardous material with same chemical content as requested hazardous material. |
| B. Material/Party Mismatch | Characteristic of material to be delivered is inconsistent with characteristic of party. |
| C. Material/Party History Mismatch | Requested material inconsistent with party history of material requests. |
| D. Material of Interest | Requested material automatically merits further inquiry. |

A first category of flags are generated particularly based on characteristics of the material(s) involved in the requested movement, either in their own respect, or based on a possible incongruity between the material and a party involved in the movement. For example, the "Material/Class Overlap(s)" flag could be generated to notify a reviewer of a controlled material movement request that the home heating oil that is subject of the request is chemically similar (or identical) to diesel motor fuel. A "Material/Party Mismatch" flag could be generated where a request has been made to deliver home heating oil to a gas station. A "Material/Party History Mismatch" flag could be generated where a request has been made to deliver home heating oil to a destination who has only previously received diesel fuel. A possible use for the "Material of Interest" flag could include a highly hazardous material, or a material of interest based on recent intelligence. For example, ammonia-based fertilizer could be temporarily deemed a material of interest, and flagged each time a movement thereof was requested.

TABLE 2

Material Volume Flags

| | |
|---|---|
| A. Volume/Party Mismatch | Requested volume inconsistent with available volume of party. |
| B. Volume/Party History Mismatch | Requested volume inconsistent with party history of orders. |
| C. Volume/Delivery Mismatch | Volume delivered to destination inconsistent with planned volume to be delivered. |
| D. Volume of Interest | Volume of request and/or history of requests meet independent criteria for meriting further inquiry. |

A second category of flags are generated particularly based on the amount of material requested. For example, a "Volume/Party Mismatch" flag could be generated where 10,000 gallons of aviation fuel are requested to be delivered to a destination that is on record as only having capacity for 5,000 gallons. A "Volume/Party History Mismatch" flag could be generated where a marketer requests 10,000 gallons of aviation fuel, but has never previously requested more than 1,000 gallons. A "Volume/Delivery Mismatch" flag could be generated where a delivery ticked indicates that only 500 gallons of diesel fuel are actually delivered to a destination scheduled to receive 5000 gallons. A "Volume of Interest" flag could be set to trigger whenever an amount of that material exceeding a particular threshold is exceeded. "Volume of Interest" thresholds could advantageously be set separately based upon the material.

TABLE 3

Material Movement Flags

| | |
|---|---|
| A. Overdue Movement | Movement delivery time later than estimated delivery time. |
| B. Direction/Destination Mismatch | Movement travels in direction inconsistent with planned destination. |
| C. Anticipated/Actual Track Mismatch | Movement deviates from anticipated track. |
| D. Excessive Stops | Number of movement stops exceeds threshold. |
| E. Enforcement Avoidance | Movement avoids enforcement locations in direction of travel. |
| F. Delivery Mismatch | Delivery destination(s) inconsistent with planned destination(s). |
| G. Location/Route of Interest | Movement involves location and/or route previously determined to be of interest. |

A third category of flags are generated based on where the carrier goes after receiving the material from the origin. With the proliferation of tablet computers, smart phones and the like that are equipped with GPS receivers or otherwise able to track their geographic location, in addition portable GPS receivers themselves, the system 10 can advantageously take advantage of the capabilities of such devices to receive regular position updates from any carrier. However, the present invention is not necessarily limited thereto, and can employ other location inputs. For example, discrete reports of movement location can be received from the origin, enforcement assets and destinations. When a carrier stops at a weigh station, is pulled over, passes through a toll or other monitored location, a location report can be generated. In between discrete position reports, and for determining where a movement is expected to be, position can be estimated based on predicted routes, speed estimates, traffic reports and the like.

An "Overdue Movement" flag could be generated after a predetermined period of time has passed after a carrier receives the controlled material at the origin, but before delivery is indicated. For example, an "Overdue Movement" flag could be generated where a carrier is scheduled to deliver a controlled material to a destination within 100 miles of the origin, but does not arrive within four hours. As described above, various techniques can be employed for determining an estimated arrival time. A "Direction/Destination Mismatch" flag could be generated when a movement is scheduled to deliver controlled material to one or more destinations to south of the origin, but the carrier is reported at a location several miles north of the origin. An "Anticipated/Actual Track Mismatch" flag could involve projecting a moving corridor of travel between the origin and the destination at a reasonable rate of advance, incorporating tolerances ahead of, behind and to the side of an expected route. If the carrier's location is reported outside that corridor, then the flag would be generated. An "Excessive Stops" flag could be generated where a carrier makes an excessive number of stops for a given distance or time traveled—for example, if the carrier is detected making 3 stops in one hour. An "Enforcement Avoidance" flag could be generated where a carrier is determined to be following a route that avoids more than one enforcement checkpoint.

A "Delivery Mismatch" flag could be generated where a carrier is determined to have stopped at a destination (or stopped and delivered material) different from the planned destination(s). A "Location/Route of Interest" flag could be employed in a situation where it is desired to draw additional attention to movements going to or through certain areas. For example, a "Location/Route of Interest" flag could be set-up to identify all movements passing within one mile of the Pentagon.

TABLE 4

Party Flags

| | | |
|---|---|---|
| A. | Ineligible Party | Party not eligible for involvement in hazardous material movement. |
| B. | Party History | Party has previous violations and/or flags over threshold. |
| C. | Combined History | Two or more parties have combined history. |
| D. | Planned/Actual Party Mismatch | Party different from planned party involved. |
| E. | Party of Interest | Party predetermined to be of interest. |

A fourth category of flags are generated based on one or more the parties (e.g., users 30-36) involved in a movement. For example, an "Ineligible Party" flag could be generated where a carrier is selected that is not properly licensed, or where a marketer requests a movement but has been banned from involvement in controlled material movements. A "Party History" flag could be generated where a party involved in a movement averages over a certain number of flags per movement, or has had a violation within the past year. A "Combined History" flag could be generated where, even though a particular party may not exceed the "Party History" threshold, previous flags and/or violations by a combination of parties to a movement exceeds a threshold. A "Planned/Actual Party Mismatch" flag could be generated where a party not part of the planned movement is substituted. A "Party of Interest" flag can allow flexibility to designate a specific party or parties of interest, although not meeting any of the other flag criteria.

As will be appreciated, a flag condition does not necessarily need to correspond to a violation of laws or regulations (although flags can certainly be configured to do so). For example, it may be permissible and even routine for a destination to change mid-movement. As indicated, flags assist administrative users in better allocating limited time and assets. Accordingly, flag thresholds can be set based on time and assets available. Thus, where more time and assets may be available, the system 10 may be configured with lower thresholds for certain flags. Also, flag thresholds can be set to reflect administrative or other supervisory priorities. Additionally, different flags can be assigned different weights once generated.

Figure 3:
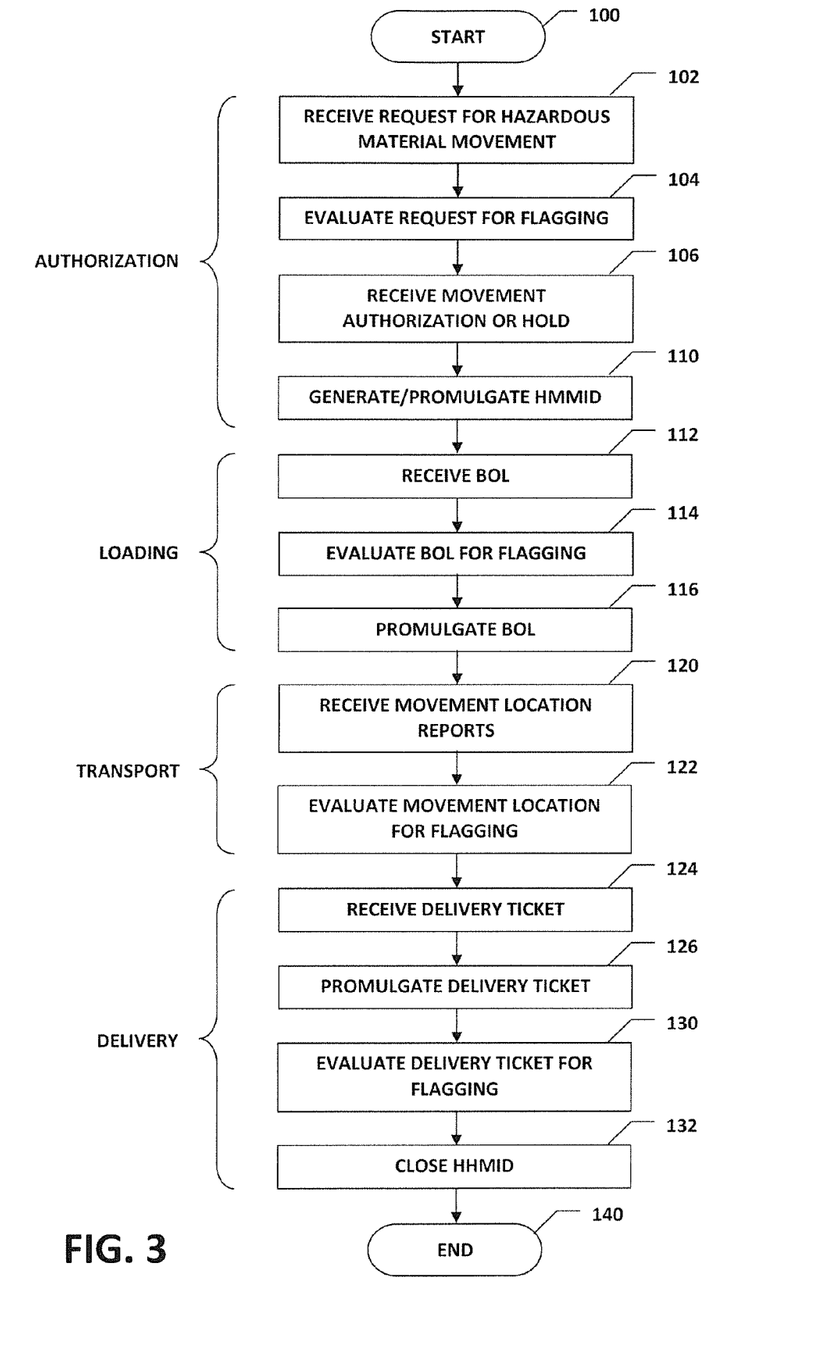
FIG. 3 is a flow diagram of operations of the controlled material movement control server of FIG. 1, in connection with a movement of controlled material.

Referring to FIG. 3, operations of the system 10 during steps of an exemplary movement will be described. The movement starts at block 100 and includes an authorization phase (blocks 102-110), a loading phase (blocks 104-116), a transport phase (blocks 120-122) and a delivery phase (blocks 124-132), and ends at block 140.

The authorization phase begins with receipt of a request for movement of a controlled material (block 102). They system 10 automatically evaluates the request, based on the information included therein, for flagging (block 104). In general, all the flags of Tables 1 and 4 could potentially be generated, as well as Table 2, flags A, B and D and Table 3, flag G. At block 110, the request is authorized (or placed hold for further resolution/denial), and the authorization is communicated to the relevant parties. Authorization preferably includes assignment of a unique identifier, which in the case of hazardous materials, would be a Hazardous Material Movement Identifier (HMMID).

The loading phase begins (unless authorization was not granted) with receipt of the BOL (block 112). The information received from the BOL provides another opportunity for flag review (block 114), and the BOL is available for display to the appropriate users (block 116). The loading phase also begins the timing for any movement flags of Table 3 that would be time dependent.

During the transport phase, location reports are received (block 120). As discussed above, these reports can be generated and reported by geo-positioning system data available from the carrier, via other party reports, and/or by estimates. The remaining Table 3 flags could be generated (block 122) during the transport phase based on the movement information supplied via the location reports.

The delivery phase begins with receipt of a delivery ticket (block 124), which is made available for viewing to the appropriate users (block 126). The information available from the ticket may result in further flags (block 130). Once all of the controlled material has been delivered, the movement is closed (block 132). It will be appreciated that where deliveries are to be made to multiple destinations, the transport and delivery phases will overlap.

Figure 4:
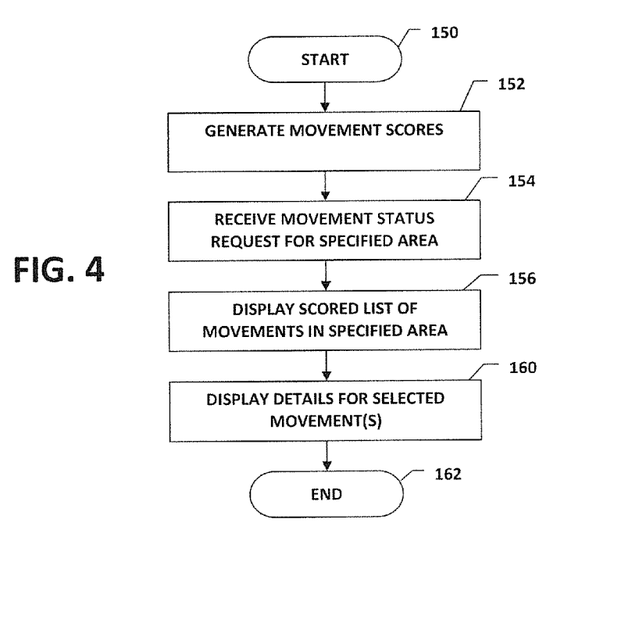
FIG. 4 is a flow diagram of additional operations of the controlled material movement control server of FIG. 1.
Figure 5:
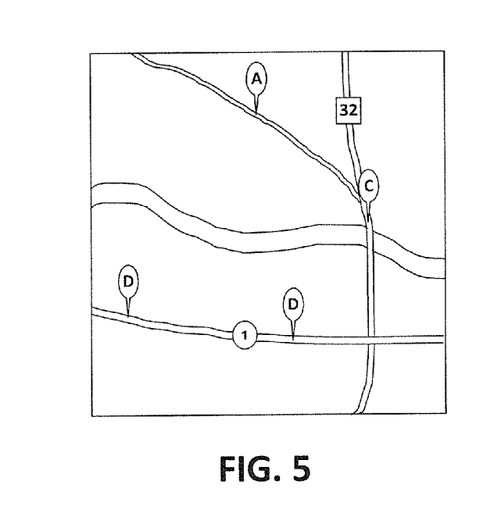
FIGS. 5 and 6 are schematic views of a user interface generated by the controlled material movement control server of FIG. 1 in connection with the operations of FIG. 4.
Figure 6:
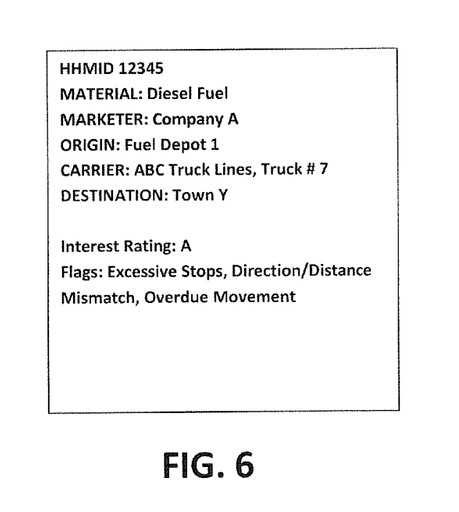

Once a movement is underway, there will be an opportunity for enforcement assets to check on the status of a movement. Additionally, a given enforcement asset, such as a police officer or other regulatory compliance official, may be located in an area through which several controlled material movements are passing at any given time. With reference to FIGS. 4-6, operations of the system 10 to assist and maximize the effectiveness of such enforcement assets are shown.

In FIG. 4, an iteration of the method starts at block 150, with the system 10 tracking multiple movements of controlled material, for which flags have been generated. All movements are scored to indicate their general interest; for instance, based on the number and weight of flags generated in connection therewith (block 152). At block 154, a request is received from an enforcement official for movement statuses within a specified area. Such a request may be a discrete request, or an automatically updated request. For example, an enforcement asset may have a computer device constantly logged onto the system 10, and continually receiving updates on all movements within a predetermined area.

The reply to the status request can be made as a scored listing of movements in the specified area (block 156). Advantageously, this listing can be a text-based list or a map-based list that graphically displays movements, as in FIG. 5. Movements can be labeled or otherwise marked to readily indicate a category of interest. In FIG. 5, for instance, a high interest movement could be labeled with an "A" and color-coded red. Lower interest movements could have other letters and/or colors. Selecting a movement from the list/map will result in display of pertinent data for that movement (block 160), as in FIG. 6. The method, which can be repeated as necessary, ends at block 162.

From the foregoing, it will be appreciated that the present invention not only centralizes the several disparate information items relating to controlled material movements, and facilitates immediate access to the information by multiple concerned parties, but also facilitates decision-making based on that information. The foregoing examples are provided for illustrative and exemplary purposes; the present invention is not necessarily limited thereto. Rather, those skilled in the art will be appreciate that the variation modifications, as well as adaptations for particular circumstances, will fall within the scope of the invention herein shown and described, and of the claims appended hereto.

What is claimed is:

1. A computer-based system for managing and tracking controlled material movements comprising at least one controlled material movement control server having at least one processor and machine-readable memory configured with program instructions to execute:
   a user interface module for receiving and displaying controlled material movement information items, the movement information items including:
   controlled material movement requests;
   movement authorizations and holds;
   bills of lading;
   movement location reports;
   movement delivery tickets; and
   movement flags;
   a movement information database for storing the movement information items;
   a rules database for storing movement flag generation rules; and
   a comparison engine for generating the movement flags based on application of the flag generation rules to the movement information items;
   wherein the user interface module is further reconfigured to automatically notify predetermined users of the receipt of a delivery ticket.

2. The system of claim 1, wherein the list is displayed graphically on a map.

3. The system of claim 1, wherein the user interface module generates an administrative user interface allowing receipt of the movement authorizations and holds and at least one non-administrative user interface that does not allow receipt of the movement authorization and holds.

4. The system of claim 3, wherein the at least one non-administrative user interface includes a marketer interface allowing receipt of the controlled material movement requests.

5. The system of claim 4, wherein the at least one non-administrative user interface further includes at least one of: an origin interface, a carrier interface and a destination interface.

6. The system of claim 1, wherein the movement flags include at least one of: material identity flags, material volume flags, material movement flags and party flags.

7. The system of claim 6, wherein the movement flags include at least one each of material identity flags, material volume flags, material movement flags and party flags.

8. The system of claim 6, wherein the user interface module is further configured to automatically notify predetermined users of movement flags.

9. The method of claim 1, wherein the movement location reports include a list of all controlled material movements within a specified area.

10. The method of claim 9, wherein the list is scored to indicate level of interest.

11. A computer-based system for managing and tracking controlled material movements comprising at least one controlled material movement control server having at least one processor and machine-readable memory configured with program instructions to execute:
   a user interface module for receiving and displaying controlled material movement information items, the movement information items including:
   controlled material movement requests;
   movement authorizations and holds;
   bills of lading;
   movement location reports;
   movement delivery tickets; and
   movement flags;
   a movement information database for storing the movement information items;
   a rules database for storing movement flag generation rules; and
   a comparison engine for generating the movement flags based on application of the flag generation rules to the movement information items;
   wherein the movement flags include at least one of: material identity flags, material volume flags, material movement flags and party flags; and
   wherein the movement flags include the material identity flags of Table 1.

12. A computer-based system for managing and tracking controlled material movements comprising at least one controlled material movement control server having at least one processor and machine-readable memory configured with program instructions to execute:
   a user interface module for receiving and displaying controlled material movement information items, the movement information items including:
   controlled material movement requests;
   movement authorizations and holds;
   bills of lading;
   movement location reports;
   movement delivery tickets; and
   movement flags;
   a movement information database for storing the movement information items;
   a rules database for storing movement flag generation rules; and
   a comparison engine for generating the movement flags based on application of the flag generation rules to the movement information items;
   wherein the movement flags include at least one of: material identity flags, material volume flags, material movement flags and party flags; and
   wherein the movement flags include the material volume flags of Table 2.

13. A computer-based system for managing and tracking controlled material movements comprising at least one controlled material movement control server having at least one processor and machine-readable memory configured with program instructions to execute:
   a user interface module for receiving and displaying controlled material movement information items, the movement information items including:
   controlled material movement requests;
   movement authorizations and holds;
   bills of lading;
   movement location reports;
   movement delivery tickets; and
   movement flags;
   a movement information database for storing the movement information items;
   a rules database for storing movement flag generation rules; and
   a comparison engine for generating the movement flags based on application of the flag generation rules to the movement information items;

wherein the movement flags include at least one of: material identity flags, material volume flags, material movement flags and party flags; and wherein the movement flags include the material movement flags of Table 3.

14. A computer-based system for managing and tracking controlled material movements comprising at least one controlled material movement control server having at least one processor and machine-readable memory configured with program instructions to execute:
- a user interface module for receiving and displaying controlled material movement information items, the movement information items including:
  - controlled material movement requests;
  - movement authorizations and holds;
  - bills of lading;
  - movement location reports;
  - movement delivery tickets; and
  - movement flags;
- a movement information database for storing the movement information items;
- a rules database for storing movement flag generation rules; and
- a comparison engine for generating the movement flags based on application of the flag generation rules to the movement information items;
- wherein the movement flags include at least one of: material identity flags, material volume flags, material movement flags and party flags; and
- wherein the movement flags include the party flags of Table 4.

15. A computer-based system for managing and tracking controlled material movements comprising at least one controlled material movement control server having at least one processor and machine-readable memory configured with program instructions to execute:
- a user interface module for receiving and displaying controlled material movement information items, the movement information items including:
  - controlled material movement requests;
  - movement authorizations and holds;
  - bills of lading;
  - movement location reports;
  - movement delivery tickets; and
  - movement flags;
- a movement information database for storing the movement information items;
- a rules database for storing movement flag generation rules; and
- a comparison engine for generating the movement flags based on application of the flag generation rules to the movement information items;
- wherein the movement flags include at least one of: material identity flags, material volume flags, material movement flags and party flags; and
- wherein the movement flags include automatic identification of any material/class overlaps.

16. A computer-based system for managing and tracking controlled material movements comprising at least one controlled material movement control server having at least one processor and machine-readable memory configured with program instructions to execute:
- a user interface module for receiving and displaying controlled material movement information items, the movement information items including:
  - controlled material movement requests;
  - movement authorizations and holds;
  - bills of lading;
  - movement location reports;
  - movement delivery tickets; and
  - movement flags;
- a movement information database for storing the movement information items;
- a rules database for storing movement flag generation rules; and
- a comparison engine for generating the movement flags based on application of the flag generation rules to the movement information items;
- wherein the movement flags include at least one of: material identity flags, material volume flags, material movement flags and party flags; and
- wherein the movement flags include automatic identification of any material/party mismatches.

17. A computer-based system for managing and tracking controlled material movements comprising at least one controlled material movement control server having at least one processor and machine-readable memory configured with program instructions to execute:
- a user interface module for receiving and displaying controlled material movement information items, the movement information items including:
  - controlled material movement requests;
  - movement authorizations and holds;
  - bills of lading;
  - movement location reports;
  - movement delivery tickets; and
  - movement flags;
- a movement information database for storing the movement information items;
- a rules database for storing movement flag generation rules; and
- a comparison engine for generating the movement flags based on application of the flag generation rules to the movement information items;
- wherein the movement flags include at least one of: material identity flags, material volume flags, material movement flags and party flags; and
- wherein the movement flags include automatic identification of enforcement avoidance.

18. A computer-based method for managing and tracking controlled material movements, the method comprising:
- receiving, in at least one controlled material movement server, a request for a movement of controlled material;
- assigning, in the at least one controlled material movement server, a unique identifier to the movement;
- communicating, via the at least one controlled material movement server, notification of authorization of the movement;
- receiving, in the at least one controlled material movement server, a bill of lading for the movement;
- receiving, in the at least one controlled material movement server, a delivery ticket for the movement;
- communicating, via the at least one controlled material movement server, notification of the delivery ticket;
- determining, with the at least one controlled material movement server, whether a material movement flag should be generated when new movement information is received; and
- communicating, via the at least one controlled material movement server, notification of the material movement flag;
- wherein determining whether a material movement flag should be generated includes determining whether a flag criteria has been met regarding all of: a material identity characteristic, a material volume characteristic, a material movement characteristic and a party characteristic.

19. The method of claim 18, further comprising displaying, via the at least one controlled material server, a map of a current location of the at least one movement.

20. The method of claim 18, wherein a plurality of movements of controlled material are tracked by the at least one controlled material movement server, the method further comprising:

determining, with the at least one controlled material movement server, an interest score for each of the plurality of movements; and communicating, via the at least one controlled material movement server, at least some of the plurality of movements with indications of their interest scores.

\* \* \* \* \*